ELECTRONICALLY TUNABLE YIG FILTER HAVING AN ELECTRONICALLY VARIABLE BANDWIDTH

Filed March 4, 1966

PRIOR ART

United States Patent Office 3,435,385

Patented Mar. 25, 1969

3,435,385

ELECTRONICALLY TUNABLE YIG FILTER HAVING AN ELECTRONICALLY VARIABLE BANDWIDTH

Morris Cohen, Oceanside, N.Y., assignor to Loral Corporation, Bronx, N.Y., a corporation of Delaware Filed Mar. 4, 1966, Ser. No. 531,660
Int. Cl. H03h 7/10, 7/44
U.S. Cl. 333—73 3 Claims

ABSTRACT OF THE DISCLOSURE

Improved electronically tunable microwave filter construction having each of the inner conductor members of first and second coaxial conductors looping about a sphere of ferromagnetic material and lying in intersecting planes passing therethrough. A grounded varactor is connected to each of the loops and a variable D.C. current source is connected to the varactor for altering its bias.

This invention relates generally to the field of microwave transmission, and more particularly to an electronically tunable YIG filter having an electronically variable bandwidth.

The use of gyromagnetic elements as electronic coupling devices is relatively well known in the art, these devices normally allowing a relatively narrow band pass achieved by providing loops which surround the gyromagnetic material which are relatively closely coupled. While for many applications a relatively narrow band pass is desirable, other applications require an adjustable bandwidth. This effect can be obtained mechanically by providing for a looser coupling, but obviously such an arrangement is not convenient where any degree of further adjustment must be continuously available.

In essence, an examination of a YIG sphere, or other equivalent ferromagnetic materials, and the surrounding microwave structure indicates that the resonance sphere operates at maximum efficiency when in the presence of a strong RF magnetic field, i.e. near a short circuit. In the standard YIG filters, employing coaxial or strip-line conductors, or wave guides, the YIG sphere is placed near a short circuit for maximum coupling, minimum insertion loss and maximum bandwidth. It is evident that if the sphere were placed further from the short circuit, i.e. weaker RF magnetic field, looser coupling, increased insertion loss and narrower bandwidth would result.

I have found that in effect, this phenomenon could be controlled electronically by placing a varactor in series with the coupling line. Voltage controlled capacitance changes would in effect vary the electrical line length between the short circuit and the YIG sphere. If low line width (high unloaded Q) YIG spheres are used, the degradation of insertion loss at narrow bandwidths are relatively minimal.

It is therefore among the principal objects of the present invention to provide an electrically tunable YIG filter having a variable bandwidth obtained by means of an electric rather than a mechanical variable element.

Another object of the invention lies in the provision of an improved electronically tunable YIG filter in which the bandpass may be conveniently varied by means of variable capacitance, in turn altered by varying a voltage fed to the device.

A further object of the invention lies in the provision of an improved electronically tunable filter having an electronically variable bandwidth in which the overall size and weight of the same is not materially increased as compared with prior art devices not having an electronically variable bandwidth.

A further object of the invention lies in the provision of an improved electronically tunable filter in which the cost of fabrication may be of a reasonably low order, directly comparable with existing prior art devices, thereby permitting consequent wide sale, distribution and use.

In the drawing, to which reference will be made in the specification:

Figure 1:
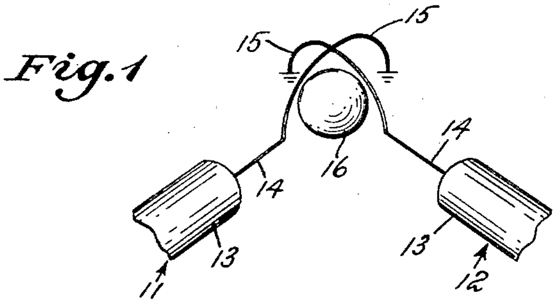
FIGURE 1 is a schematic view showing a standard loop coupling configuration employed in a ferromagnetic microwave filter.

Referring to FIGURE 1 in the drawing, as is known in the art, ferromagnetic coupling devices of the class described normally comprise first and second coaxial conductors 11 and 12, respectively, each including an outer conductor member 13 and an inner conductor member 14. The inner conductor members 14 each form a loop 15 abut a ferromagnetic sphere 16, and are subsequently grounded at 17. During operation, the sphere 16 is subjected to the action of an externally applied magnetic D.C. field which will cause the sphere to be resonant at predetermined frequency to conduct microwave transmission at such frequency. Normally, the width of the frequency band transmitted will be relatively narrow, and depend to a very large degree upon the tightness of the loop coupling and other factors.

Figure 2:
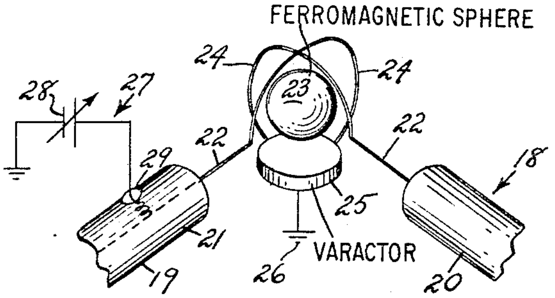
FIGURE 2 is a similar schematic view of a first embodiment of the invention, employing certain components shown in FIGURE 1.

Referring to FIGURE 2, the first embodiment of the invention, generally indicated by reference character 18, includes first and second conductors 19 and 20, respectively, each including an outer conductor member 21 and an inner conductor member 22. Each inner conductor member 22 is looped about a sphere 23, as indicated by reference character 24, but the free ends thereof are interconnected to a varactor 25, the varactor in turn being grounded at 26.

Connected to the conductor 19, which is assumed as the input conductor, is a varactor bias control 27 including a variable DC current source 28 connected through an opening 29 in the outer conductor member 21 to a RF bypass coil to the inner conductor member 22.

Figure 3:
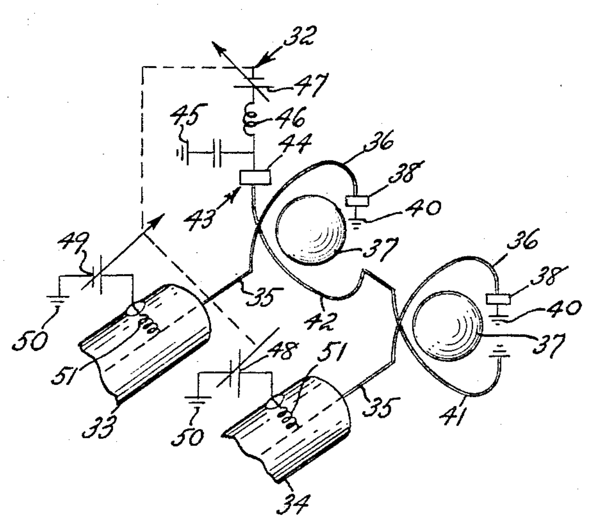
FIGURE 3 is a schematic view showing a second embodiment of the invention.

A more sophisticated construction is illustrated in FIGURE 3 in the drawing. The second embodiment, generally indicated by reference character 32 employs first and second coaxial conductors 33 and 34, respectively, the internal conductors 35 of each forming loops 36 around separate YIG spheres 37. Each loop 36 is connected to a separate varactor at 38, each varactor being grounded at 40. A coupling loop 41 is connected in series to a second coupling loop 42 leading to a bias control 43.

The bias control 43 includes a varactor 44, grounded capacitance 45, an RF bypass coil 46 and avarable DC source 47. Mechanically coupled to the DC source 47 are variable DC sources 48 and 49 each grounded at 50, and connected to a RF coil 51.

Figure 4:
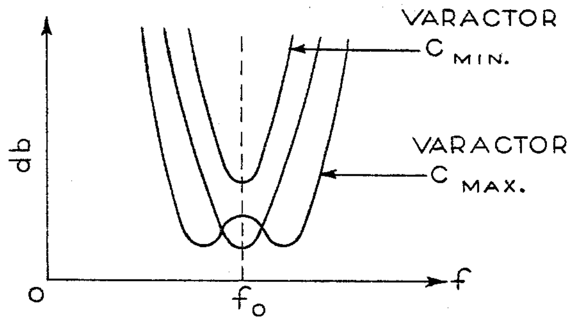
FIGURE 4 is a graph illustrating the variations in bandwidth obtainable using the second embodiment.

Referring to FIGURE 4, there is illustrated the shape of linewidth broadening available with increased db output for operation on a predetermined frequency. It will be observed that with minimum capacitance the shape of the transmitted frequency resembles that of a conventional ferromagnetic filter. At maximum capacitance, the shape of the transmitted frequency band distorts at lower db levels along the line of exact tuned frequency but only at low db levels. This distortion may be minimized by operating at a higher db level with maximum capacitance.

It may thus be seen that I have invented novel and highly useful improvements in ferromagnetic microwave filters which permit electronically tunable bandwidth. Among the advantages of using a varactor in conjunction with the loop coupling are the fact that only one electromagnet is required, so that there are no tracking problems involved. In addition, the number of YIG resonators required is dependent only upon the specified selectivity required. High speed bandwidth variations are immediately available to the user owing to the fact that the physical structure of the device is not changed from its normal compact configuration.

It wish it to be understood that I do not consider the invention limited to the precise details of structure shown and set forth in this specification, for obvious modifications will occur to those skilled in the art to which the invention pertains.

I claim:

1. An electronically tunable microwave filter having means for electronically varying transmitted bandwidth comprising: First and second coaxial conductors each including an inner and an outer conductor member, a sphere of ferromagnetic material, said inner conductor members of each of the said first and second conductors forming a loop about said sphere, said loops lying in intersecting planes passing through said sphere, a grounded varactor connected to each of said loops, and variable DC current supply means for altering the bias upon said varactor to thereby vary the transmitted bandwidth.

2. An electronically tunable microwave filter having means for electronically varying trasnmitted bandwidth comprising: First and second coaxial conductors, each including an inner and an outer conductor member, first and second ferromagnetic spheres, said inner conductor members of each of said first and second coaxial conductors forming aloop, respectively about one of said first and second spheres, a varactor connected in series with each of said loops, a coupling conductor forming a loop about each of said first and second spheres, and variable DC current supply means connected to said coupling conductor.

3. Structure in accordance with claim 2, including a varactor connected in series between said DC current source and said coupling conductor.

References Cited

UNITED STATES PATENTS

| | | | |
|---|---|---|---|
| 3,164,792 | 1/1965 | Georgiev et al. | 333—73 |
| 3,290,625 | 12/1966 | Bartram et al. | 333—73 |
| 3,299,376 | 1/1967 | Blau et al. | 333—73 |

ELI LIEBERMAN, *Primary Examiner.*

PAUL L. GENSLER, *Assistant Examiner.*

U.S. Cl. X.R.

307—320